April 20, 1965 L. M. PROCTOR 3,178,903
FOOD PRESERVER
Filed May 31, 1963
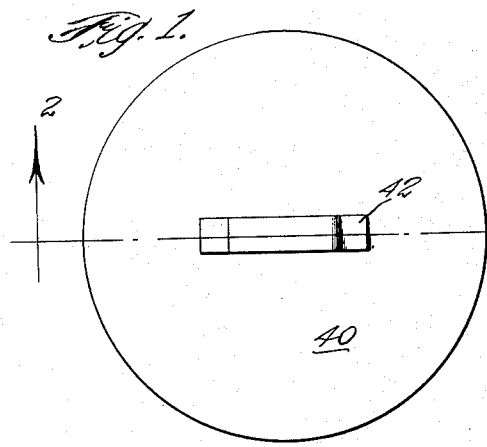
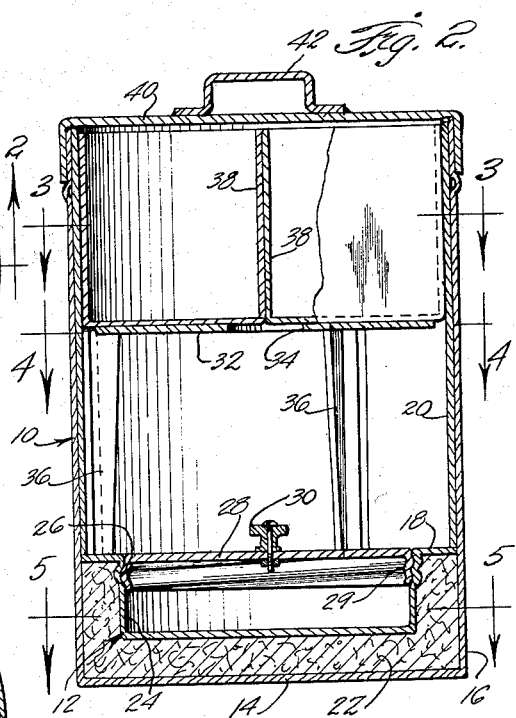
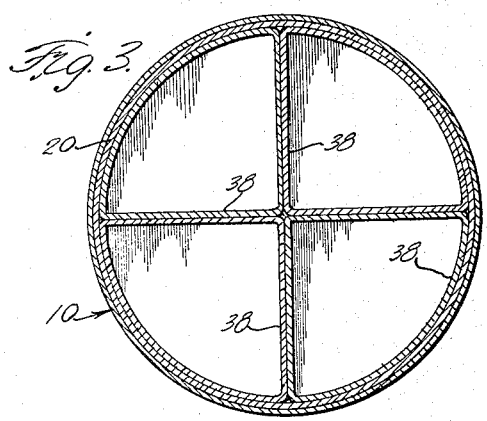
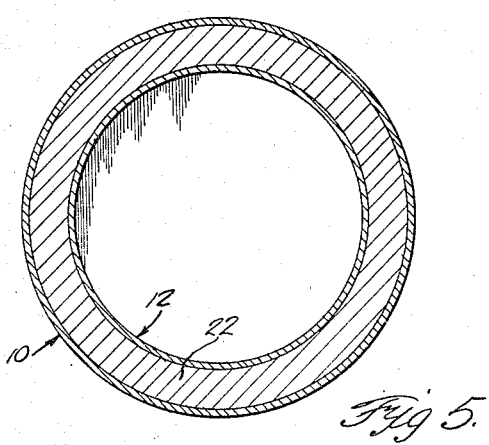
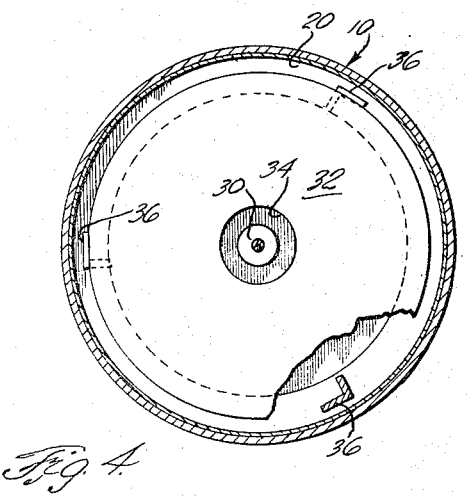
INVENTOR.
LAURA M. PROCTOR
BY

United States Patent Office 3,178,903
Patented Apr. 20, 1965

3,178,903
FOOD PRESERVER
Laura May Proctor, Box 117, Kingsland, Tex.
Filed May 31, 1963, Ser. No. 284,525
2 Claims. (Cl. 62—372)

This invention relates to a food preserver.

An object of the present invention is to provide a device of this character in which a large quantity of food may be stored and kept fresh by Dry Ice placed in a compartment formed near the bottom of the container and surrounded by insulation.

Another object of the invention is to provide the chamber for Dry Ice with a cover which is easily removable and when in place constitutes a portion of a bottom for a food chamber.

Another object of the present invention is to provide within the container a platform supported by legs which rest upon the bottom of the food container and exteriorly of the removable cover for the Dry Ice compartment, the platform or table constituting a support for food placed within the container over a lower mass of food resting directly upon the bottom of the food container.

A further object of the invention is to provide within the container a number of receptacles which rest upon the platform and completely fill the portion of the food chamber over the platform.

A still further object of the invention is to provide a device of this character which is simple in construction, easy to clean, and not liable to be broken.

The invention is illustrated in the accompanying drawing, wherein:

FIGURE 1 is a top plan view of the food preserver,

FIGURE 2 is a sectional view taken vertically through the food preserver along line 2—2 of FIGURE 1, FIGURE 3 is a sectional view taken transversely through the upper portion of the food preserver along line 3—3 of FIGURE 2, FIGURE 4 is a sectional view taken along line 4—4 of FIGURE 2, and FIGURE 5 is a sectional view taken transversely through the lower portion of the food preserver along line 5—5 of FIGURE 2.

This improved food preserver is intended for use by people who take lunches or other means to work with them or for use by picnic parties desiring to take cold food with them and prevent the food from being spoiled by hot weather before it is eaten.

The container 10, of the invention, is formed of metal or other desirable material and may be of any dimensions desired. In the lower portion of the container 10 is a supplemental container 12 defining a compartment adapted to receive a quantity of Dry Ice. This supplemental container 12 is spaced from the bottom 14 and side wall 16 of the main container 10 and about its open upper end is provided with a marginal flange 18 having close contacting engagement with the wall 16 of the main container 10. A liner 20 is provided for the main container 10 between the flange 18 and the open upper end of the main container 10 and may be formed integral with the flange or separate therefrom and secured to the wall 16 of the main container in any desired manner.

The space within the main container 10 below and about the auxiliary container 12 is filled with cork or other insulation 22 and prevents too rapid evaporation of the Dry Ice. The wall 24 of the auxiliary container 12 is threaded as shown at 26 in order that a cover 28 having a flange 29 may be screwed into place and attention is called to the fact that when the cover 28 is applied its upper surface is flush with the upper surface of the flange 18 so that the cover 28 and the flange 18 may cooperate with each other to form a flat bottom for the food chamber within the main container 10. A knob 30 which is secured at the center of the cover 28 projects upwardly therefrom and constitutes means by which the cover 28 may be easily screwed into or out of place.

When the food preserver is in use, meat or other heavy and bulky articles are placed within the main container and rest upon the bottom formed by the flange 18 and the cover 28. A platform 32 having a center opening 34 is then set in place within the main container 10 and since this platform 32 is provided with depending legs 36 spaced from each other about its periphery and resting upon the flange 18 it will be supported in position over food resting upon the bottom of the food chamber. After the platform 32 has been set in place auxiliary food containers 38 are set in place within the upper portion of the main container 10 and rest upon the platform, the auxiliary containers 38 being of such depth that their open upper ends are flush with the upper end of the main container 10.

In view of the fact that the platform 32 is formed with the center opening 34 and the edge of the platform 32 is spaced from wall 16 of the main container 10 air may flow upwardly and chill the auxiliary containers to prevent food in the auxiliary containers 38 from spoiling. Since the legs 36 are formed of angle metal they will not bend when subjected to weight of food in the containers 38.

The upper end of the main container 10 is closed by a cover 40 which is provided with a handle 42 and since this cover 40 fits tightly about the main container 10, cold air will be retained in the main container 10 and food therein will be preserved against spoilage by exposure to heat.

While only a preferred embodiment of the present invention has been illustrated and described, it will be obvious that the invention may be otherwise embodied and the dimensions and interrelation of parts changed so long as the objects of the invention are attained.

What is claimed is:

1. A food preserver comprising a main container open at its top and having a bottom and a side wall, an auxiliary container for a refrigerant in the lower portion of the main container open at its top and having its top surrounded by a flange having marginal contact with side wall of the main container, said auxiliary container being spaced from the bottom and side wall of the main container, insulation filling space between the auxiliary container and the side wall and bottom of the main container, a removable cover for the upper end of the auxiliary container having a depending flange screwed into engagement the wall of the auxiliary container, a platform in the main container having depending legs spaced from each other about its periphery and resting upon the flange of the refrigerant container to support the platform in an elevated position, said platform being spaced from the wall of the main container and being formed with an opening at its center, food containers in the upper portion of the main container resting upon said platform, said food containers terminating flush with the upper edge of the main container and a removable cover for the upper end of the main container and auxiliary containers.

2. A food preserver comprising a main container open at its top and having a bottom and a side wall, a refrigerant container in the lower portion of said main container spaced from the bottom and side wall of the main container and at its top being surrounded by a flange having marginal contact with the wall of the main container, a cover for the refrigerant container having its upper surface flush with the upper surface of said flange and co-operating with the flange to form a bottom for a main food chamber in said container, a platform in said main container having depending legs resting upon said flange and supporting the platform in an elevated position, auxiliary food container in the upper portion of the main container and resting upon said platform, and a removable cover for the open top of the main container.

References Cited by the Examiner
UNITED STATES PATENTS

| | | | |
|---|---|---|---|
| 601,798 | 4/98 | Slomka | 62—457 |
| 2,673,454 | 3/54 | Gallie et al. | 62—341 XR |
| 2,713,779 | 7/55 | Fitzgibbons | 62—457 |
| 2,767,563 | 10/56 | Picascia | 62—457 |
| 3,106,074 | 10/63 | Amburgey | 62—464 |

ROBERT A. O'LEARY, *Primary Examiner.*